United States Patent
Lyons et al.

(10) Patent No.: US 10,216,619 B2
(45) Date of Patent: Feb. 26, 2019

(54) SYSTEM AND METHOD FOR TEST AUTOMATION USING A DECENTRALIZED SELF-CONTAINED TEST ENVIRONMENT PLATFORM

(71) Applicant: JPMorgan Chase Bank, N.A., New York, NY (US)

(72) Inventors: Michael Robert Lyons, Geneva, IL (US); James A. Twing, Houston, TX (US)

(73) Assignee: JPMorgan Chase Bank, N.A., New York, NY (US)

( * ) Notice: Subject to any disclaimer, the term of this patent is extended or adjusted under 35 U.S.C. 154(b) by 0 days.

(21) Appl. No.: 15/631,942

(22) Filed: Jun. 23, 2017

(65) Prior Publication Data
US 2018/0373619 A1 Dec. 27, 2018

(51) Int. Cl.
G06F 11/36 (2006.01)
G06F 11/00 (2006.01)
G06F 9/44 (2018.01)
G06F 8/70 (2018.01)

(52) U.S. Cl.
CPC ............ *G06F 11/3672* (2013.01); *G06F 8/70* (2013.01); *G06F 9/44* (2013.01); *G06F 11/3688* (2013.01)

(58) Field of Classification Search
CPC ............ G06F 11/3684; G06F 11/3688; G06F 17/2247; G06F 17/243; G06F 11/368; G06F 11/3672; G06F 8/71; G06F 8/70; G06F 9/44; G09B 19/00; H04L 43/50
See application file for complete search history.

(56) References Cited

U.S. PATENT DOCUMENTS

| | | | | |
|---|---|---|---|---|
| 9,354,998 B2* | 5/2016 | Hyland | .................. | G06F 11/28 |
| 9,842,045 B2* | 12/2017 | Heorhiadi | ........... | H04L 41/5038 |
| 9,886,375 B2* | 2/2018 | Rumble | .............. | G06F 11/3692 |
| 9,898,393 B2* | 2/2018 | Moorthi | ................ | G06F 11/368 |
| 10,007,596 B2* | 6/2018 | Pilot | .................... | G06F 11/3684 |
| 2008/0209275 A1* | 8/2008 | Kwan | ................. | G06F 11/3688 |
| | | | | 714/38.14 |

(Continued)

OTHER PUBLICATIONS

T. Nivas, Test harness and script design principles for automated testing of non-GUI or web based applications, 8 pages (Year: 2011).*

(Continued)

*Primary Examiner* — Thuy Dao
(74) *Attorney, Agent, or Firm* — Hunton Andrews Kurth LLP

(57) ABSTRACT

A workstation with at least one computer processor receives a plurality of testing tools for testing a program. The workstation receives from a server a testing dashboard. The testing dashboard includes core code that retrieves an external configuration file for one of the plurality of tools and injects the external configuration file into the one of the plurality of tools at runtime. The testing dashboard also includes a testing script that specifies an order of execution of the plurality of tools. The workstation executes the core code to retrieve the external configuration file for the one of the plurality of tools. The workstation executes the testing script to execute the plurality of tools. The workstation presents the results of the execution of the testing script.

18 Claims, 7 Drawing Sheets

(56) References Cited

U.S. PATENT DOCUMENTS

2014/0181793 A1* 6/2014 Kaliappan ........... G06F 11/3684
717/124
2017/0103013 A1* 4/2017 Grechanik ............ G06F 11/366
2017/0279681 A1* 9/2017 Vuolteenaho ....... H04L 41/0866

OTHER PUBLICATIONS

Patel et al., Test harness and script design principles for automated testing of non-GUI or web based applications, 10 pages (Year: 2015).*

* cited by examiner

SYSTEM AND METHOD FOR TEST AUTOMATION USING A DECENTRALIZED SELF-CONTAINED TEST ENVIRONMENT PLATFORM

BACKGROUND OF THE INVENTION

1. Field of the Invention

The present disclosure generally relates to systems and methods for test automation using a decentralized self-contained test environment platform.

2. Description of the Related Art

Both functional and non-functional testing of applications often requires specialized skills and specialized tools. In addition, both types of testing can be conducted using a combination of applications and tools which need manual configuration or intervention to work in coordination. As a result, application development teams and other non-test centric teams lack the ability to conduct this testing on their own. This leads to tests being executed later in the delivery cycle or not being executed at all resulting in increased cost to identify and/or remediate issues. In addition, test approaches and tools often vary across test teams and even individual team members leading to inconsistencies in both the results produced and the subsequent interpretation of those results.

SUMMARY OF THE INVENTION

Systems and methods for test automation using a decentralized self-contained test environment platform are disclosed. In one embodiment, a method may include, at a workstation comprising at least one computer processor: (1) the workstation receiving a plurality of testing tools for testing a program; (2) the workstation receiving, from a server, a testing dashboard comprising core code that retrieves an external configuration file for one of the plurality of tools, and injects the external configuration file into the tool at runtime, and a testing script that specifies an order of tool execution; (3) the workstation executing the core code to retrieve the external configuration file for the tool; (4) the workstation executing the testing script to execute the plurality of tools; and (5) the workstation presenting the results of the execution of the testing script.

In one embodiment, the external configuration file may be a standard tool configuration file or a custom tool configuration file.

In one embodiment, the testing dashboard may include the external configuration file.

In one embodiment, the core code may retrieve the external configuration file from a remote location.

In one embodiment, the testing tools may be received as unmodified binaries.

According to another embodiment, a method for test automation using a cluster of testing dashboards may include, in a computer network comprising a plurality of workstations, each workstation comprising at least one computer processor: (1) each workstation receiving a plurality of testing tools for testing a program; (2) each workstation receiving a testing dashboard, one of the testing dashboards being a master testing dashboard and the other testing dashboards being slave testing dashboards, each testing dashboard comprising core code that retrieves an external configuration file for one of the plurality of tools, and injects the external configuration file into the tool at runtime, and a testing that specifies an order of tool execution; (3) the master testing dashboard using a coordinator service to locate the slave testing dashboards; (4) the master testing dashboard issuing commands to the slave testing dashboards to execute its testing script on the program; and (5) one of the testing dashboards presenting the results of the execution of the testing script.

In one embodiment, the program may be hosted by one of the workstations.

In one embodiment, the program may be hosted by an external server.

In one embodiment, each of the external configuration files may be a standard tool configuration file or a custom tool configuration file.

In one embodiment, each of the testing dashboards may include the external configuration file.

In one embodiment, the core code may retrieve the external configuration file from a remote location.

In one embodiment, the testing tools may be received as unmodified binaries.

According to another embodiment, a system for test automation may include a server and a workstation in communication with the server and comprising at least one computer processor and a memory. The workstation may be programmed to receive a plurality of testing tools for testing a program; receive, from the server, a testing dashboard comprising core code that retrieves an external configuration file for one of the plurality of tools, and injects the external configuration file into the tool at runtime, and a testing script that specifies an order of tool execution; execute the core code to retrieve the external configuration file for the tool; execute the testing script to execute the plurality of tools; and present the results of the execution of the testing script.

In one embodiment, the external configuration file may be a standard tool configuration file or a custom tool configuration file.

In one embodiment, the testing dashboard may include the external configuration file.

In one embodiment, the core code may retrieve the external configuration file from a remote location.

In one embodiment, the testing tools may be received as unmodified binaries.

In one embodiment, the system may further include a second workstation comprising a second plurality of testing tools for testing a program and a slave testing dashboard comprising core code that retrieves an external configuration file for one of the second plurality of tools, and injects the external configuration file into the tool at runtime, and the testing dashboard uses a coordinator service to locate the slave testing dashboard, the testing dashboard issues commands to the slave testing dashboard to execute its testing script on the program; and one of the testing dashboard and the slave testing dashboard presents the results of the execution of the testing script.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Several embodiments of the present invention and their advantages may be understood by referring to FIGS. 1-7.

Embodiments are directed to systems and methods for test automation using a decentralized self-contained test environment platform. For example, according to embodiments, portable, self-contained test platforms that may include all necessary tools and configurations for testing, may support multiple different, parallel configurations, etc. are disclosed. In one embodiment, configurable, application-specific test instances may be created and provided to enable self-service performance test execution. In one embodiment, test execution may be performed in the cloud.

Portable testing platforms may include a toolkit that may provide tools, services, and/or custom components that may provide specific capabilities and functions. Example tools include load testing tools (e.g., Apache JMeter), Elasticsearch, Logstash, Kibana, Jenkins, etc. Example services may include integration components such as cloud integration. Example custom components may include an analysis dashboard, test scripts, custom utilities, etc.

Portable testing platforms may further include one or more dashboard, which may be self-contained portable implementations of the tools encapsulated and externalized configuration details and settings that may be built for a specific purpose. In one embodiment, the dashboard may be built from tools, integration components, and/or custom components. The dashboard may be replicated as necessary and/or desired.

In one embodiment, a portable container for tools is provided. The portable container may provide the ability to externally maintain tool configurations, inject those configurations into new tool processes at startup, and control the running instances of the tool specific to that instance. Users may leverage and/or configure the underlying tools to suit their needs.

In one embodiment, instances may be configured for load testing, monitor running applications and report on their health, execute functional tests, automate application builds, etc. These are all usages that can be supported by combining the underlying tools in different ways.

Figure 1:
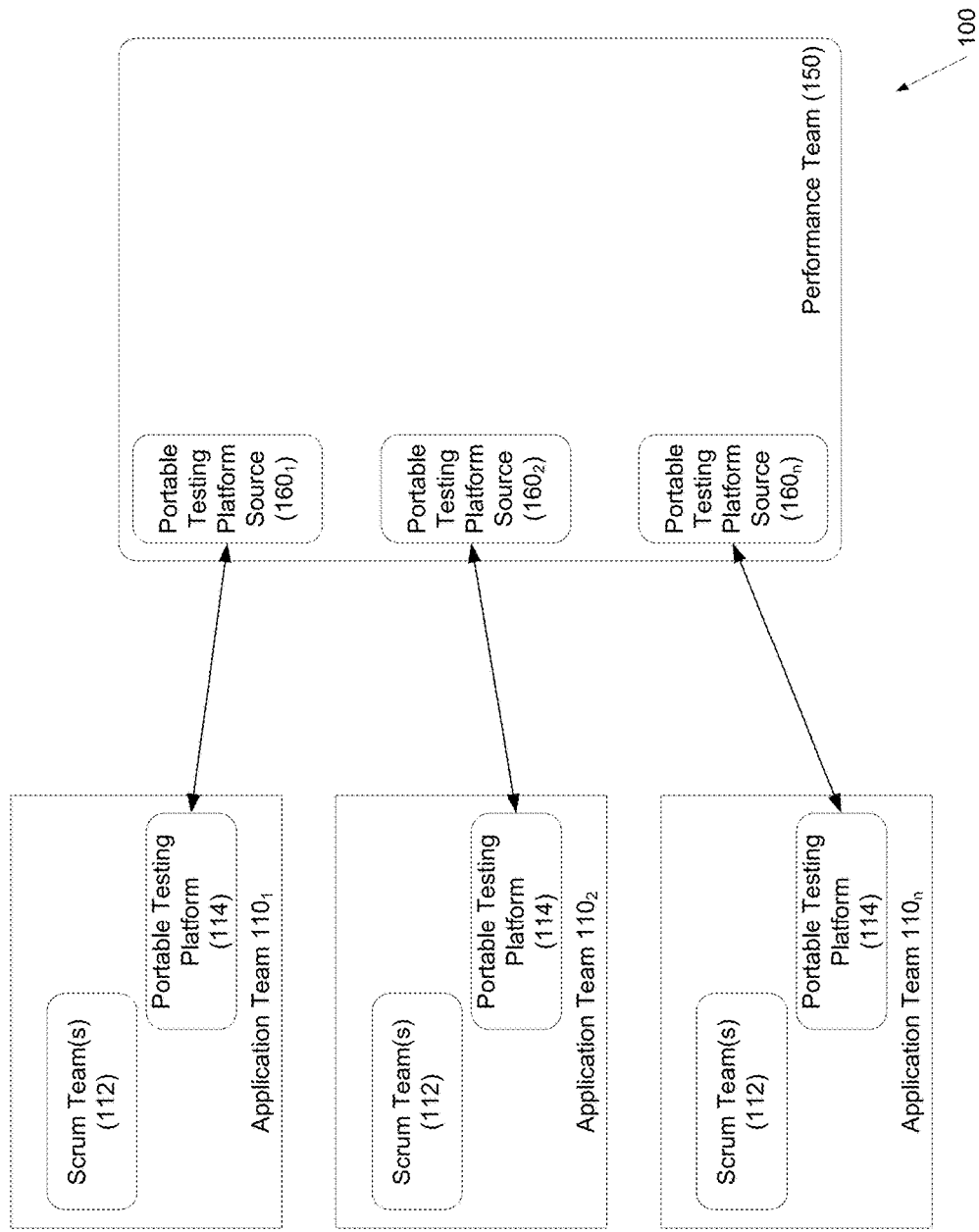
FIG. 1 depicts a system for test automation using a decentralized self-contained test environment platform according to one embodiment.

Referring to FIG. 1, an environment for test automation using a decentralized self-contained test environment platform is disclosed according to one embodiment. System 100 may include one or more application teams (e.g., application team 110$_1$, application team 110$_2$, application team 110$_n$, etc.) and one or more performance team 150. In one embodiment, each application team 110 may include one or more scrum team 112, and one or portable testing platform 114. In one embodiment, each scrum team 112 may develop computer programs, applications, code, etc. that may need to be tested. Each application team may be organized in any suitable manner.

Each application team 110 may include one or more computers (e.g., workstations, desktop computers, notebook computers, tablet computers, etc.) that may execute portable testing platform 114. In one embodiment, portable testing platform 114 may be configured by performance team 150. Portable testing platform 114 may comprise tools, integration components, and/or custom components that may be used to test a specific application that may be developed by application team 110.

In one embodiment, application team 110 may receive portable testing platform 114 from portable testing platform source 160 provided by performance team 150. In one embodiment, portable testing platform source 160 may provide custom-developed portable testing platforms 114 to one or more application team 110.

In one embodiment, the process flow for setting up tests, executing tests, and tearing down or resetting environments post-test may be automated. For example, the Jenkins automation server tool may be used to facilitate this process. For example, the collected metrics may be used (based on the focus of the tests being run) for application tuning, issue diagnostics, or any other suitable analysis activity with respect to the application under test.

Figure 2:
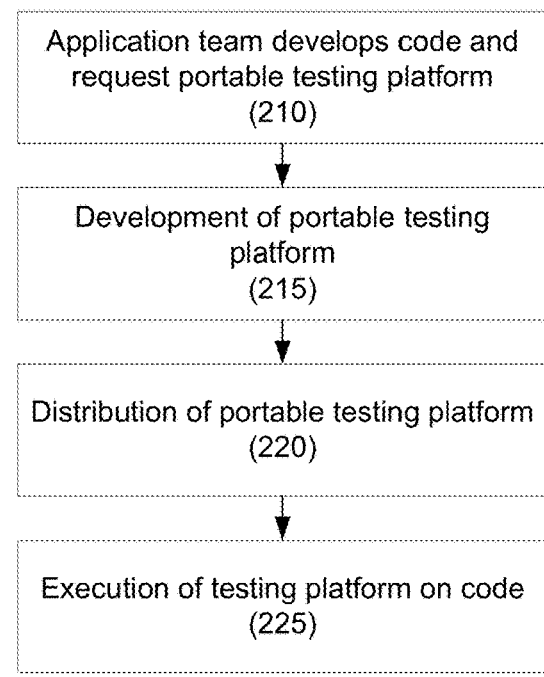
FIG. 2 depicts a method for test automation using a decentralized self-contained test environment platform according to one embodiment.

Referring to FIG. 2, a method for test automation using a decentralized self-contained test environment platform is disclosed according to one embodiment. In step 210, an application team may develop code for an application, program, or other code. To test the code, the application team may request a portable (e.g., deployable) testing platform.

In one embodiment, the application team may specify a type of testing platform desired, for example, either functional or non-functional.

In step 215, a portable testing platform may developed for the application. In one embodiment, the portable testing platform may develop externalized configuration files for the tools that will be used to test the code.

In step 220, the portable testing platform may be deployed to the requesting application team.

In step 225, the portable testing platform may be made available to other application teams. For example, the testing platform may be made available in a testing library.

Figure 3:
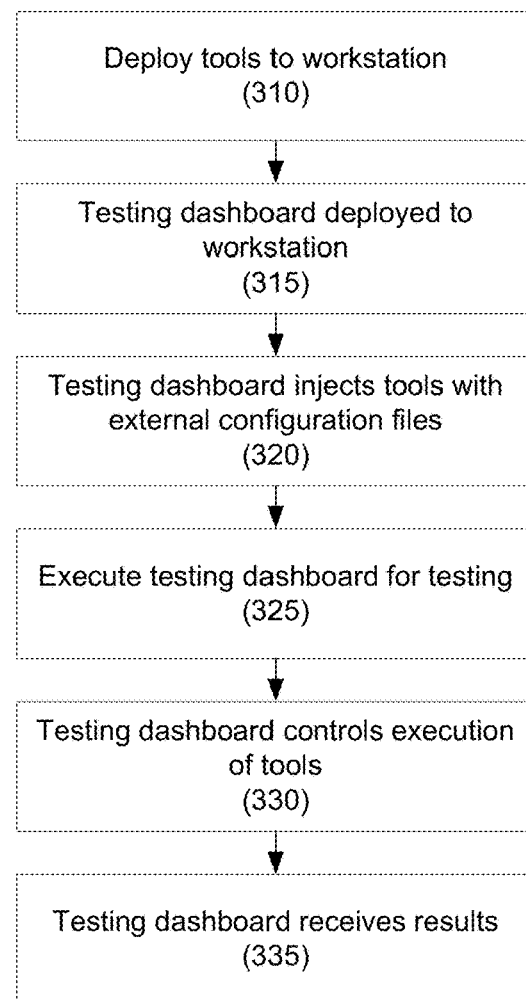
FIG. 3 depicts a method of application testing using a portable testing platform according to one embodiment.

Referring to FIG. 3, a method of application testing using a portable testing platform is disclosed according to one embodiment.

In step 310, testing tools may be deployed to a workstation, computer, or other device. Example testing tools include Apache JMeter, Elasticsearch, Logstash, Kibana, Jenkins, etc.

In one embodiment, the testing tools may be deployed in standard configurations; in other words, they are deployed unmodified.

In step 315, a testing dashboard may be deployed to the workstation. In one embodiment, the dashboard may be container that may maintain tool configurations, inject those configurations into new tool processes at startup, and control the running instances of the tool specific to that instance.

In one embodiment, each dashboard instance may be configured for a particular test, such as load testing, monitoring running applications and reporting on their health, executing functional tests, automating application builds, etc.

In one embodiment, the dashboard may comprise core code and configuration, externalized tool configurations, test scripts, and test results. In one embodiment, when the core code is executed (e.g., commands are issued by the user), the externalized tool configurations are read from within the dashboard instance and the necessary tool processes are started with the externalized tool configurations injected.

In one embodiment, the core code may comprise scripts and services that manage, maintain, and apply the externalized configurations for each of the tools. For example, it may download tool binaries as necessary, start, stop, and coordinate tool execution, inject external tool configurations, monitor process execution at runtime, manage cluster coordination, etc.

In one embodiment, a user may issue commands using the dashboard. For example, the start command may start the core suite of tools that are injected with the custom configurations from within the dashboard.

In one embodiment, if the external tool configurations are not on the workstation, the dashboard may retrieve the actual tool binaries and installs them on the workstation.

In one embodiment, the external configuration files may be one of two types—a copy of a standard tool configuration file, and custom tool configuration file. For example, standard tool configurations may be copied per instance/dashboard and may be injected at runtime in order to enable the support of multiple parallel configurations at the same time. Custom configuration files be provided to centralize parameters such as host names and ports for all of the supported tools. This may maintain connectivity between tools in a single location.

In step 320, the testing dashboard may inject the external configuration files into the tools. In one embodiment, some tools (e.g., Elasticsearch, Logstash, and JMeter) support the ability to override the default configuration file by providing a startup parameter containing the location of the override file. Some tools may also accept environment variables. In embodiments, these system environment variables may be set to values appropriate to its needs. For tools that are less flexible, a parameterized template approach may be used, where the typical tool config file may be overwritten dynamically by a provided substitute that may be created for each launch so that any changes are captured.

In step 325, the testing dashboard may be executed. In one embodiment, the testing dashboard using the testing tools that are deployed to the workstation. In one embodiment, the testing dashboard may also download any missing testing tools to the workstation as is necessary and/or desired.

In step 330, the testing dashboard may control the execution of the tools. For example, the testing dashboard may provide control and coordination of the tools, such as ensuring that the tools are started in the correct order and that dependencies among the tools are satisfied.

In step 335, the testing dashboard may present the results of the testing.

Figure 4:
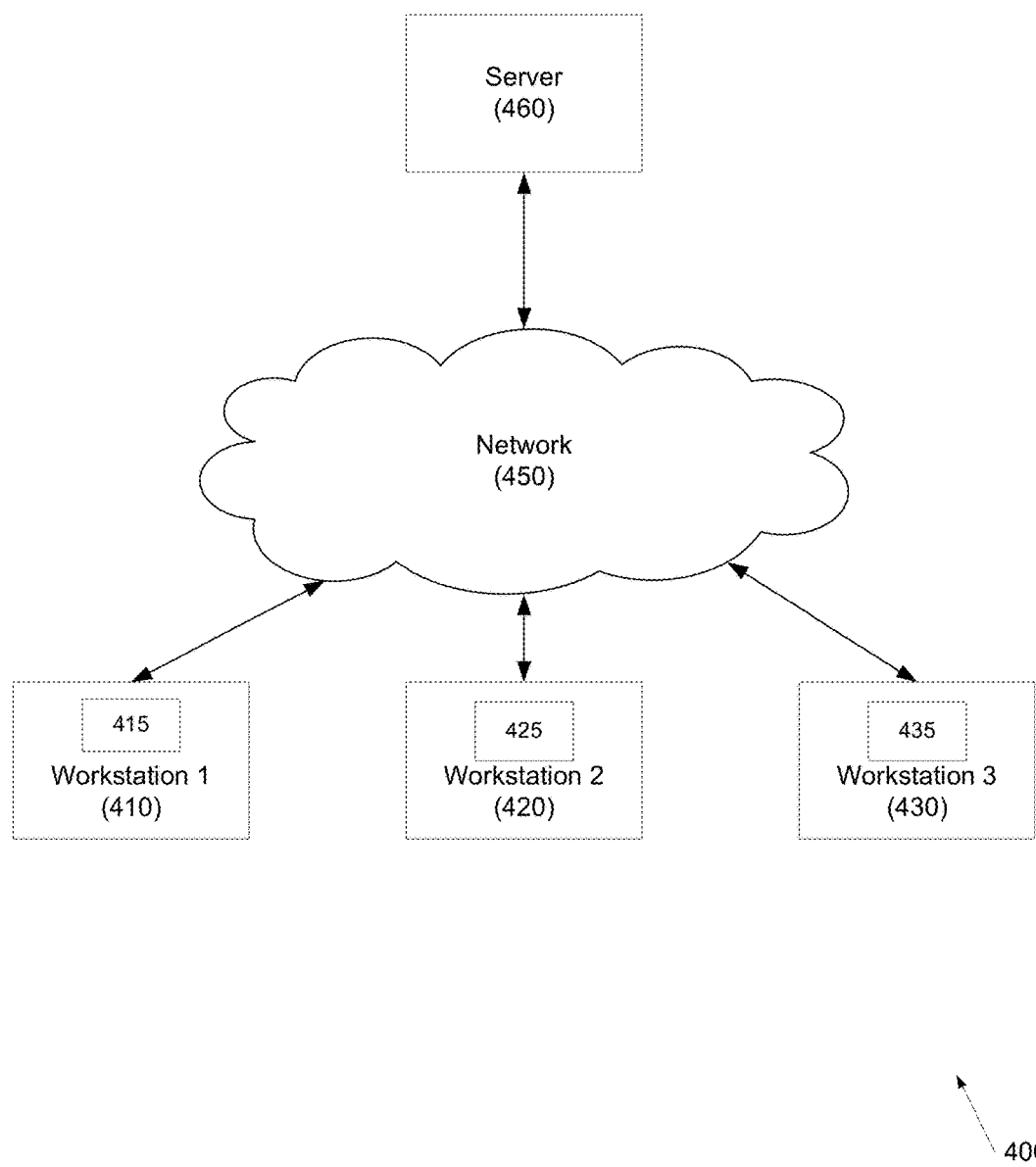
FIG. 4 depicts a system for clustered testing according to one embodiment.

Referring to FIG. 4, a system for clustered testing is provided according to one embodiment. System 400 may include workstations 410, 420, and 430. Greater or fewer workstations may be provided as is necessary and/or desired.

Workstations 410, 420, 430 may communicate via network 450, which may be any suitable network, including the Internet, intranets, etc.

In one embodiment, testing dashboard 415, 425, and 425 may be deployed to each of one of workstations 410, 420, 430, respectively.

In one embodiment, one of the testing dashboards may be considered to be a "master," while the other testing dashboards are considered to be the slave. For example, in one embodiment, testing dashboard 415 may be the master, and testing dashboards 425 and 435 are the slaves. Master testing dashboard 415 may control the activity of slave testing dashboards 425 and 435 so that all of testing dashboards 415, 425, and 435 may test an application, program, or code that may be hosted by one of workstations 410, 420, or 430, or by workstation or server 460.

In one embodiment, each workstation 410, 420, 430 may include an internal custom coordinator service that may sends and receives commands. The master workstation—which may be any of the workstations—may be configured with the location (host and port) of the slaves in the cluster. For example, if workstation 410 is the master, workstations 420 and 430 may be the slaves. Thus, master workstation 410 may locate the slave workstations 420 and 430 using this configuration and may send the necessary control commands to the slave workstations 420 and 430 via the embedded controller service.

Figure 5:
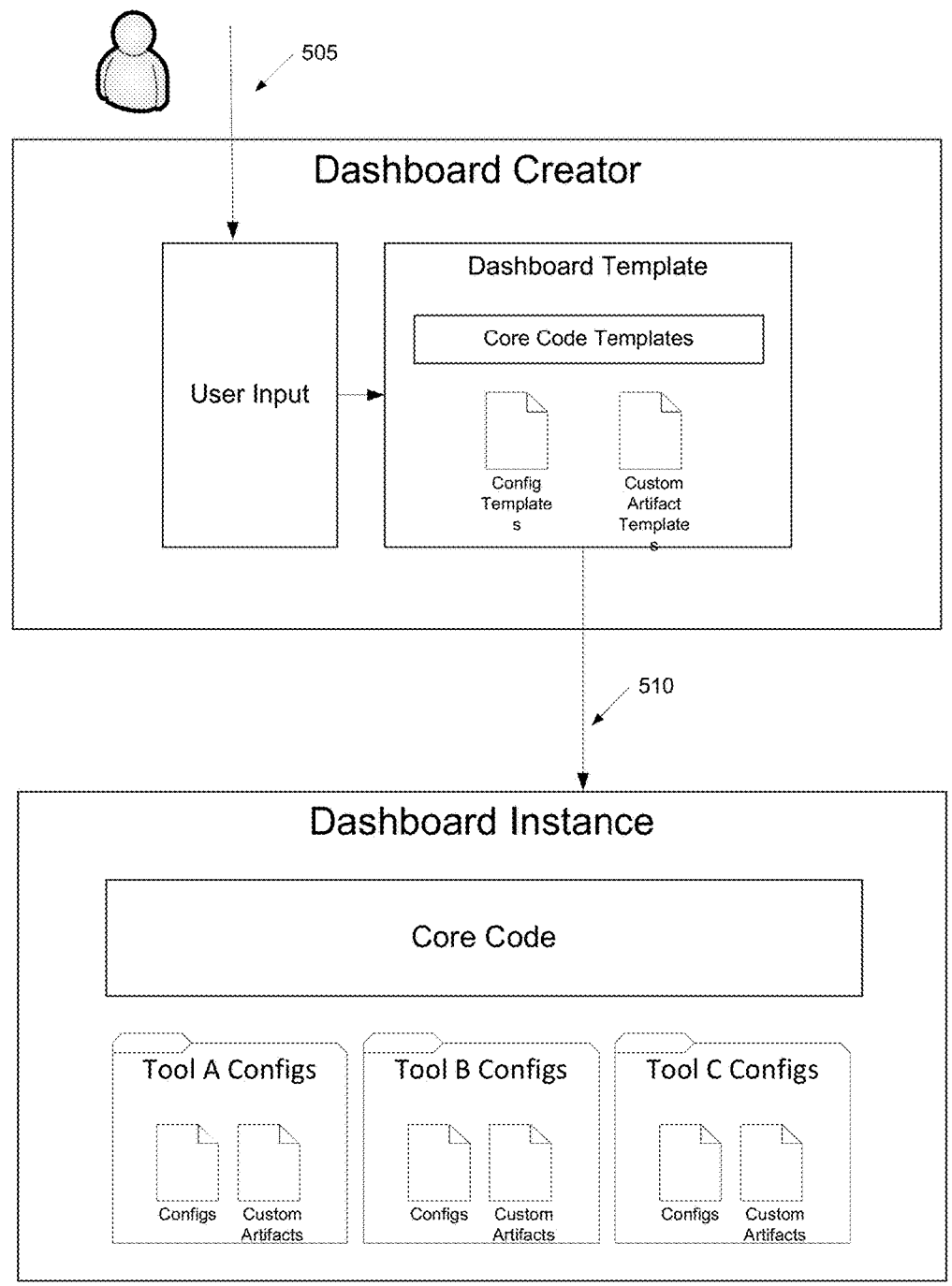
FIG. 5 depicts an exemplary process flow for creating a dashboard creator is provided according to one embodiment.

Referring to FIG. 5, an exemplary process flow for creating a dashboard creator is provided according to one embodiment. In step 505, a user may provide required input data to the dashboard creator application such as unique identifiers (name, application ID, etc.). Any additional information may be provided as is necessary and/or desired.

In step 510, the dashboard creator may apply user supplied data to pre-defined templates and may generate a downloadable, customized dashboard instance.

Figure 6:
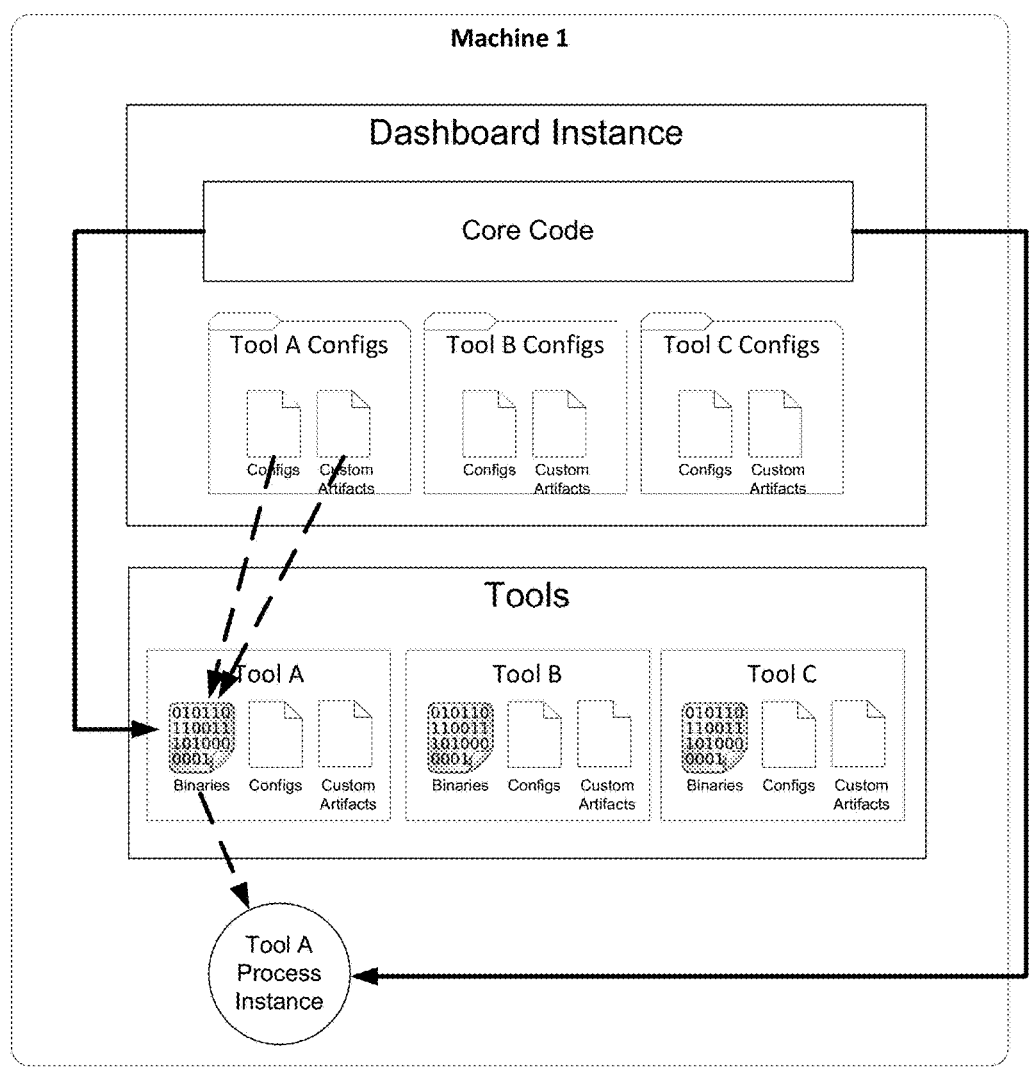
FIG. 6 depicts an exemplary process flow of creating a dashboard is disclosed according to one embodiment.

Referring to FIG. 6, an exemplary process flow of creating a dashboard is disclosed according to one embodiment. As discussed above, dashboard instances that contain external versions of the primary tool configurations and any custom artifacts such as test scripts, templates, etc. are provided to, for example, a machine.

In one embodiment, the core code may be used to initialize individual process instances of the core tools by invoking commands using the installed tool binaries and injecting the externalized versions of the configs and custom artifacts. Configs and artifacts that may be co-located with the tool installations are ignored.

Next, individual process instances (e.g., "Tool A Process Instance") may be managed via the dashboard instance. Each instance is aware of processes initialized by that dashboard and will ignore other running processes on the same machine, even if those processes are initialized by other dashboards.

Figure 7:
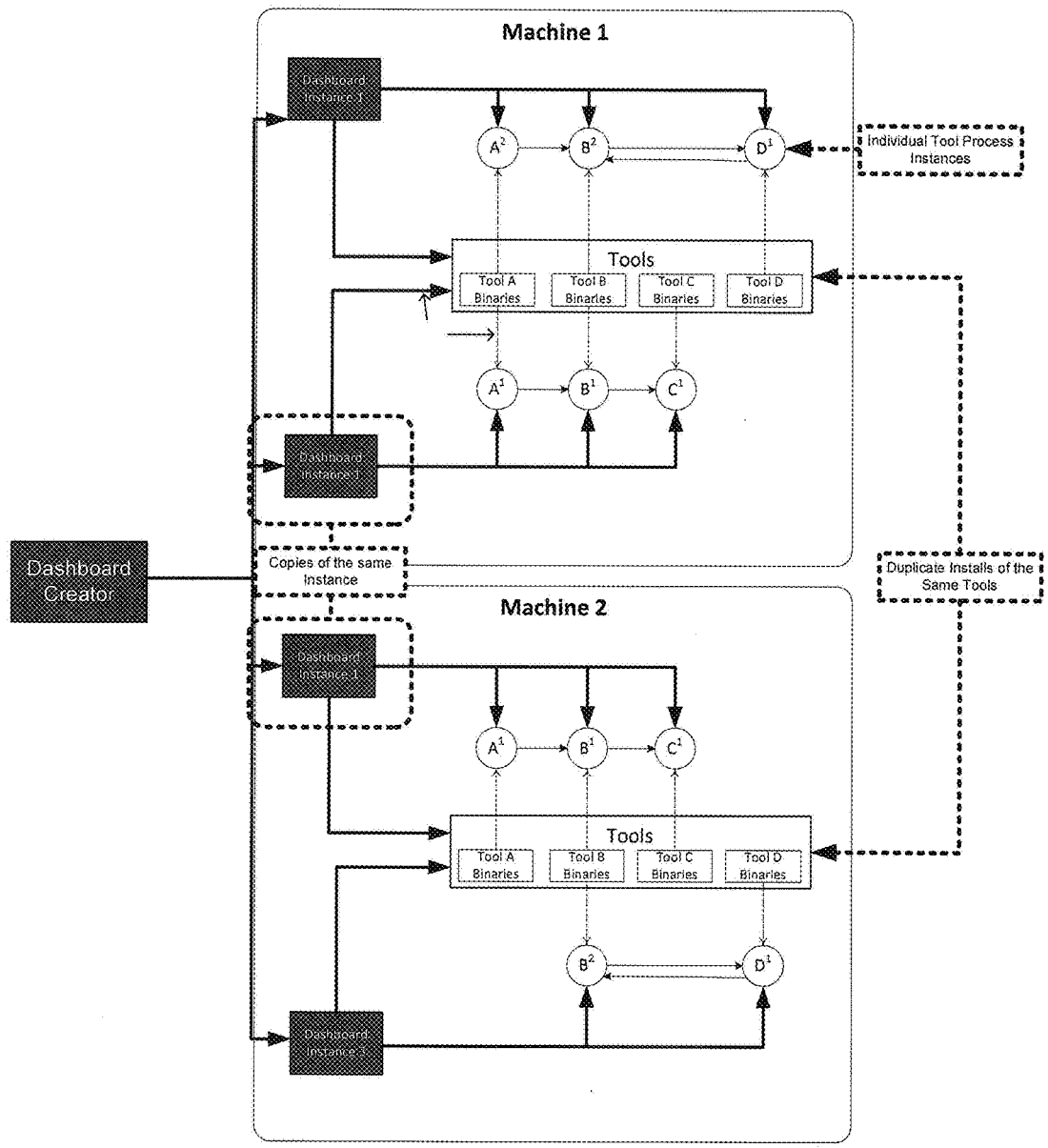
FIG. 7 depicts an exemplary process flow of using the dashboard instances is disclosed according to one embodiment.

Referring to FIG. 7, an exemplary process flow of using the dashboard instances is disclosed according to one embodiment. As discussed above, the dashboard creator application may create one or more default dashboard instances. In one embodiment, users may customize configurations of default dashboards to as necessary and/or desired.

Next, and also as discussed above, each instance may use standard tool installs to create tool process instances, each with the tool configuration injected from the individual instance.

In one embodiment, dashboard instances may be used to control the tool process instances they created.

In one embodiment, dashboard instances may be portable and may be copied across machines and used without modification provided that all machines have the standard set of tools.

Although several embodiments have been disclosed, it should be recognized that these embodiments are not exclusive to each other.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for test automation, comprising:
   at a workstation comprising at least one computer processor:
      the workstation receiving a plurality of testing tools for testing a program;
      the workstation receiving, from a server, a testing dashboard comprising core code that retrieves an external configuration file for one of the plurality of tools, and injects the external configuration file into the one of the plurality of tools at runtime, and a testing script that specifies an order of execution of the plurality of tools;
      the workstation executing the core code to retrieve the external configuration file for the one of the plurality of tools;
      the workstation executing the testing script to execute the plurality of tools; and
      the workstation presenting the results of the execution of the testing script.

2. The method of claim 1, wherein the external configuration file is one of a standard tool configuration file and a custom tool configuration file.

3. The method of claim 1, wherein the testing dashboard comprises the external configuration file.

4. The method of claim 1, wherein the core code retrieves the external configuration file from a remote location.

5. The method of claim 1, wherein the testing tools are received as unmodified binaries.

6. A method for test automation using a cluster of testing dashboards, comprising:
   in a computer network comprising a plurality of workstations, each workstation comprising at least one computer processor:
      each workstation receiving a plurality of testing tools for testing a program;
      each workstation receiving a testing dashboard, one of the testing dashboards being a master testing dashboard and the other testing dashboards being slave testing dashboards, each testing dashboard comprising core code that retrieves an external configuration file for one of the plurality of tools, and injects the external configuration file into the one of the plurality of tools at runtime, and a testing script that specifies an order of execution of the plurality of tools;

the master testing dashboard using a coordinator service to locate the slave testing dashboards;

the master testing dashboard issuing commands to the slave testing dashboards to execute its testing script on the program; and one of the testing dashboards presenting the results of the execution of the testing script.

7. The method of claim 6, wherein the program is hosted by one of the workstations.

8. The method of claim 6, wherein the program is hosted by an external server.

9. The method of claim 6, wherein each of the external configuration files is one of a standard tool configuration file and a custom tool configuration file.

10. The method of claim 6, wherein each of the testing dashboards comprises the external configuration file.

11. The method of claim 6, wherein the core code retrieves the external configuration file from a remote location.

12. The method of claim 6, wherein the testing tools are received as unmodified binaries.

13. A system for test automation, comprising:
a server;
a workstation in communication with the server and comprising at least one computer processor and a memory, wherein the at least one computer processor is programmed to:
receive a plurality of testing tools for testing a program;
receive, from the server, a testing dashboard comprising core code that retrieves an external configuration file for one of the plurality of tools, and injects the external configuration file into the one of the plurality of tools at runtime, and a testing script that specifies an order of execution of the plurality of tools;
execute the core code to retrieve the external configuration file for the one of the plurality of tools;
execute the testing script to execute the plurality of tools; and
present the results of the execution of the testing script.

14. The system of claim 13, wherein the external configuration file is one of a standard tool configuration file and a custom tool configuration file.

15. The system of claim 13, wherein the testing dashboard comprises the external configuration file.

16. The system of claim 13, wherein the core code retrieves the external configuration file from a remote location.

17. The system of claim 13, wherein the testing tools are received as unmodified binaries.

18. The system of claim 13, further comprising:
a second workstation comprising a second plurality of testing tools for testing a program and a slave testing dashboard comprising core code that retrieves an external configuration file for one of the second plurality of tools, and injects the external configuration file into the one of the second plurality of tools at runtime;
wherein:
the testing dashboard uses a coordinator service to locate the slave testing dashboard;
the testing dashboard issues commands to the slave testing dashboard to execute its testing script on the program; and
one of the testing dashboard and the slave testing dashboard presents the results of the execution of the testing script.

* * * * *